July 21, 1964 — J. T. MULLEN — 3,141,252
TIRE INSERT DISPLAY SIGNS
Filed Aug. 24, 1961 — 2 Sheets-Sheet 1
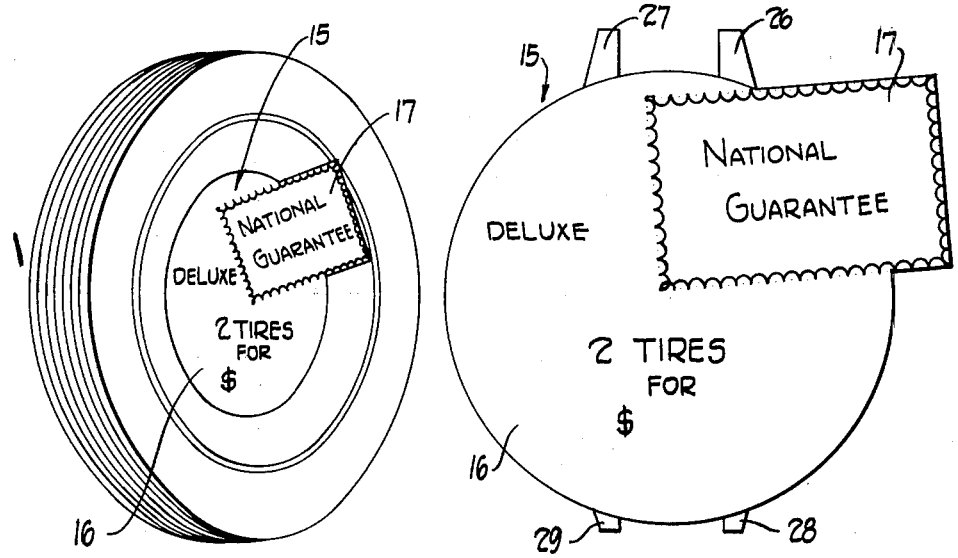
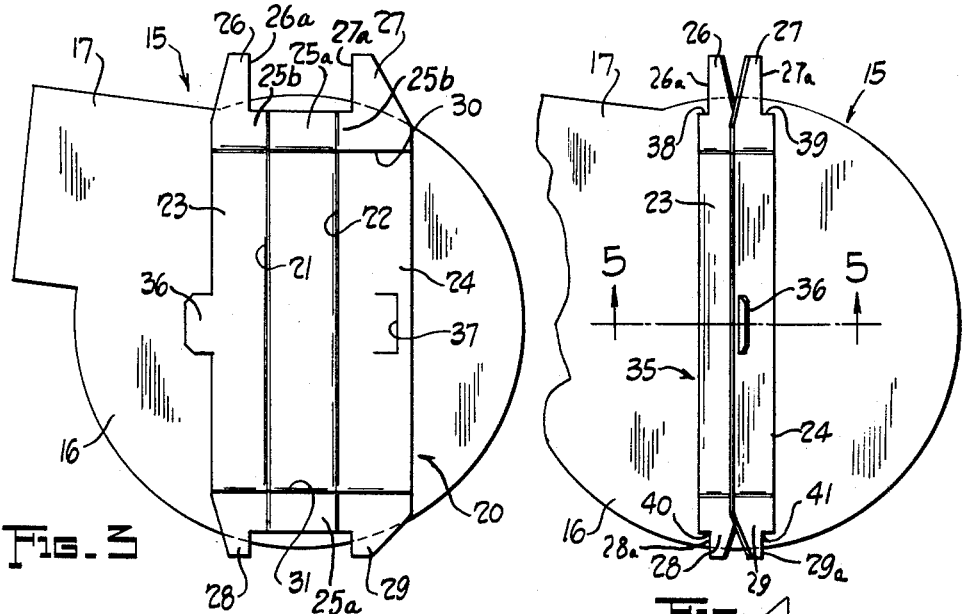
INVENTOR.
JAMES T. MULLEN
BY
ATTORNEY.

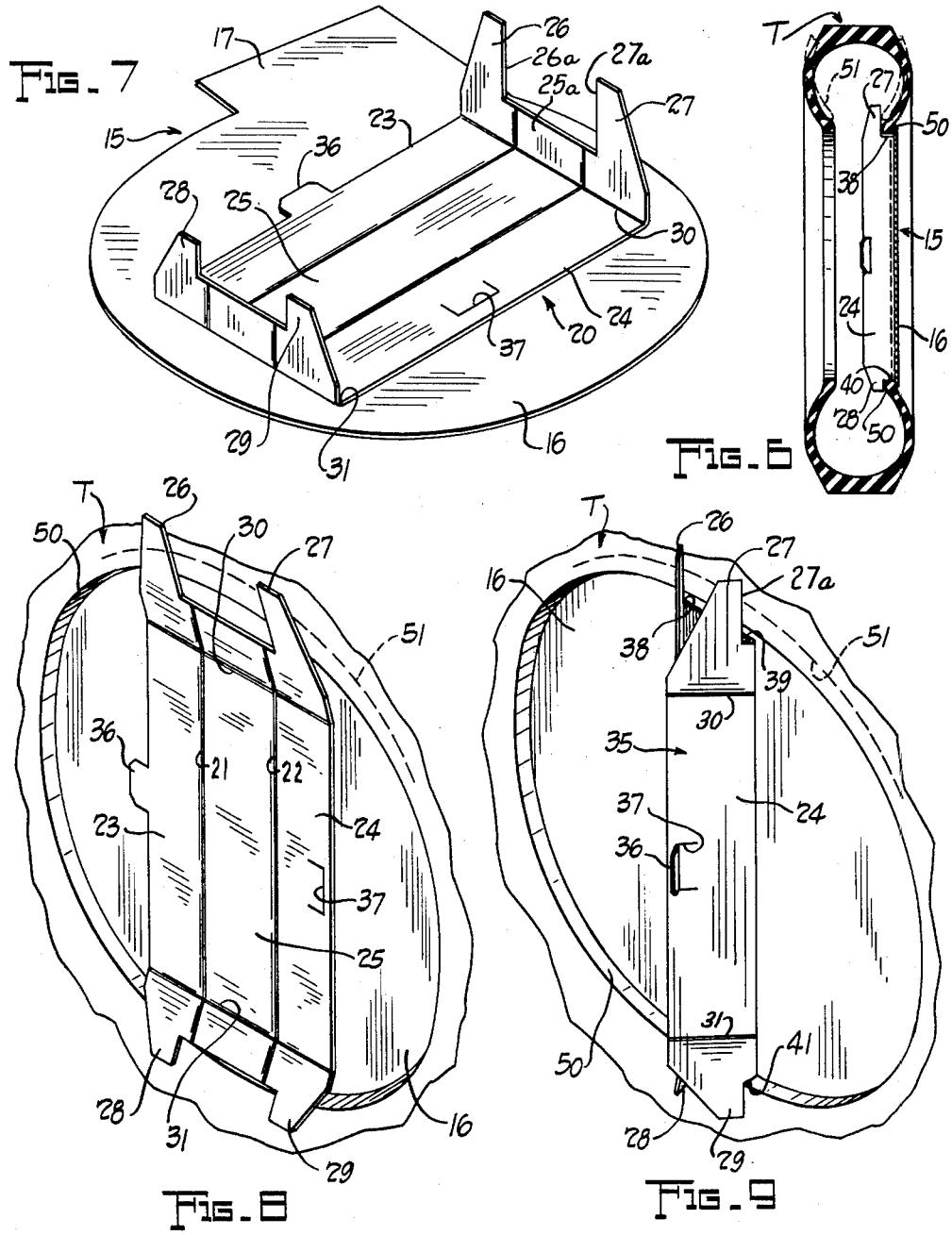
July 21, 1964     J. T. MULLEN     3,141,252
TIRE INSERT DISPLAY SIGNS
Filed Aug. 24, 1961     2 Sheets-Sheet 2
INVENTOR.
JAMES T. MULLEN
ATTORNEY.

United States Patent Office 3,141,252
Patented July 21, 1964

3,141,252
TIRE INSERT DISPLAY SIGNS
James T. Mullen, Cleveland, Ohio, assignor to Dyment Co., Cleveland, Ohio, a corporation of Ohio
Filed Aug. 24, 1961, Ser. No. 133,733
4 Claims. (Cl. 40—125)

This invention relates generally to display signs, and more specifically to a type known as "tire inserts" which may be mounted at one side of a tire and be locked in an improved manner within the rim bead at the adjacent side of the tire.

A principal object of the invention is to provide a novel stiffening, locking, and supporting easel for a tire insert display sign that enables the insert to be interchangeably mounted on automobile tires of different sizes, as for example, tires adapted to be mounted on wheels of 14 and 15 inch rim sizes.

A further object of the invention is to provide a tire display sign as set forth in the previous paragraph which may be quickly and easily mounted in a neat and attractive manner on the side of an automobile tire without bending, creasing or otherwise damaging the sign, and which may be thereafter securely locked in its mounted position.

Still another object of the invention is to provide a tire display sign having the advantages set forth above which is inexpensive to manufacture and is easily shipped and stored prior to use.

Other objects and advantages of the invention will become apparent from the following detailed description and the accompanying drawings.

In the drawings:

FIGURE 1 is a view showing the tire insert sign comprising the invention mounted and locked within the rim bead of a tire;

FIGURE 2 is a front elevational view of the sign;

FIGURE 3 is a rear elevational view of the tire insert sign and securing means or easel prior to folding it for use.

FIGURE 4 is a rear elevational view illustrating the folded or supporting position of the novel locking easel;

FIGURE 5 is a cross-sectional view taken along the line 5—5 of FIGURE 4;

FIGURE 6 is a vertical cross-sectional view of a tire having the tire insert sign mounted in display position;

FIGURE 7 is a rear elevational view of the insert illustrating how the ends of the supporting easel are bent preparatory to inserting it within the bead of a tire;

FIGURE 8 is a rear elevational view illustrating the insert sign immediately after the securing easel has been mounted within the rim of a tire; and FIGURE 9 is a view illustrating the final step of folding the easel to lock the insert sign in position on the tire.

Referring first to FIGS. 1–5, the tire insert sign 15 is shown as including a flat, substantially circular panel 16 which may carry on its front surface any desired advertising message. The generally circular shape of the panel 16 is preferred so that it will fill the side rim space of the tire on which the insert is mounted; however, if desired, the insert 15 may be formed with one or more decorative extensions 17 which project beyond the circumference of the panel.

The display panel 16 is preferably constructed of printed paper stock mounted on chip board or other suitable backing material, such as corrugated board or the like. When the insert sign 15 is intended to be used out-of-doors, it also is preferred to provide it with a wax coating for the purpose of making it water-resistant.

Mounted on the rear of the panel 16 is a substantially rectangular sheet 20 of stiff paper material, such as chip board or the like, which may be folded to form the novel securing means or locking easel 35 (FIG. 4). The sheet 20 is cut-scored for folding along parallel, spaced lines 21 and 22 to define foldable side marginal flanges 23 and 24 and a center section 25. In the preferred construction of the invention, the center section 25 lies along a diameter of the panel 16 and is secured to its rear surface by any suitable means, such as glue or the like. As illustrated, the ends of the center section 25 terminate short of the peripheral edge of the panel.

The side marginal flanges 23 and 24 of the easel blank 20 are formed with integrally extending lugs 26, 27, 28, and 29 that normally project beyond the circumferential edge of the panel 16, the lugs 26 and 27 being of greater length than the opposite lugs 28 and 29. The formation of the sheet 20 is completed by creasing it for folding along the lines 30 and 31. The creased fold lines 30 and 31 transversely extend across the sheet 20 and permit the ends of the flanges 23 and 24, as well as the end portions of the center section 25, to be temporarily folded rearwardly so that the lugs 26–29 lie within the substantially circular boundary of the panel 16 (FIG. 7).

Obviously to permit the folding of the end portions of the center section 25, only that area between the fold lines 30 and 31 is glued or secured to the rear face of the advertising panel 16.

It should be noted that a substantial area 25a at each end of the center section 25 and between the fold lines 21 and 22 are integral with the extended lug portions 26, 27, 28, and 29. Thus, when these lugs and the ends of the center section are turned inwardly, as shown in FIG. 7, for insertion into the lead of the tire, they lie substantially in the same planes at right angles to the easel sections 23, 24, and 25, as well as thus projecting inwardly from the panel 16. These intermediate connecting portions between the fold lines 21 and 22 and outwardly beyond the fold lines 30 and 31 serve to cause the lug portions to become realigned with the easel sections 23 and 24 when these side portions of the easel are folded inwardly into the triangular formation shown in FIGS. 4 and 9. Thus, the effect of this folding inwardly straightens the side panels and lug portions ino the projecting positions engaging the inner side of the bead of the tire.

As most clearly illustrated in FIG. 4, the side marginal flanges 23 and 24 are foldable toward each other about the fold lines 21 and 22 to form the triangular stiffening, supporting, and locking easel 35. A tab 36 which extends beyond the side edge of the flange 23 is adapted to project through and be tightly held in a cooperating slit 37 cut in the flange 24 as appears in FIG. 5. The triangular easel is thus held in its supporting and locking position. The outer edge of each of the areas 25a extend beyond the fold lines 21 and 22, as at 25b, to the parallel outwardly extending inner edges of the lugs, as at 26a and 27a. Thus, these edges of the lugs 26 to 29 are spaced from the rear surface of the panel 16 when the easel blank is folded forming the bead-receiving shoulders 38, 39, 40, and 41.

Without the stiff intermediate connections between the lugs at the ends of the center section of the easel, i.e., 25a, the lugs would not be folded outwardly and be firmly held in these extended positions.

As indicated, FIGS. 6–9 illustrate the progressive steps of mounting and locking the sign to the side of a tire T. As shown in FIG. 7, the ends of the easel blank 20 are first folded along the lines 30 and 31 so that the lugs 26–29 are within the generally circular boundary of the panel 16. When the end lugs 26–29 of the easel forming sheet 20 have been folded in the manner shown, the circular panel 16 may be centered at the side opening of the tire so that the marginal periphery of the panel is against the outer surface of the tire rim bead 50 and the lugs 26–29 extend into the side opening of the tire. The lugs may then be released to press against the inside surface of the tire rim bead 50 as indicated in FIG. 8.

In the final step of securing the insert sign 15 on the tire, the easel blank 20 is folded about the score lines 21 and 22 to form the triangular easel 35 and the tab 36 is secured through the slot 37 for holding the easel in its folded position.

Particular advantages of the foregoing construction are the locking action which is formed by the projecting lugs of the triangular, locking, supporting, and stiffening easel 35 and the fact that the insert sign may be interchangeably mounted and locked on tires having different rim size openings. Specifically referring to FIG. 6, it will be seen that when the triangular easel 35 has been folded behind and against the rim bead 50, part of the bead 50 at the bottom of the tire is firmly seated against the lower shoulders 40 and 41 formed by the lugs 28 and 29. Similarly, when the insert sign is mounted on tires of relatively small size, such as those adapted to fit a 14 inch rim, upper portions of the rim bead 50 diametrically opposed from those seated against the shoulders 40 and 41 will be seated against the shoulders 38 and 39, with the rear circumferential surface portion of the circular panel 16 pressing against the outside surface of the rim bead. This locking of the tire bead 50 by the easel 35 effectively prevents the insert sign 15 from being accidentally displaced from its mounted position. The easel 35 also acts to stiffen and support the panel 16.

When mounted on tires of 15 inch size, as generally indicated by the broken lines 51 in FIGS. 6, 8, and 9, the relatively long lugs 26 and 27 of the flanges 23 and 24 maintain contact with the upper, inner surface of the rim bear 50, while a portion of the bead at the bottom of the tire is again locked against the shoulders 40 and 41.

Another advantage of the invention is the quickness and obvious facility with which the insert sign 15 may be mounted on a tire without creasing the panel 16 or marring its display surface.

As noted above, the illustrated, generally circular shape of the panel 16 is such that it substantially fills the rim opening at one side of the tire to thus present a neat and attractive display. However, it will be apparent that the particular shape of the insert may be varied if desired.

Other modifications and variations of the invention will be apparent to those skilled in the art in view of the foregoing detailed description. Therefore, it is to be understood that, within the scope of the appended claims, the invention may be practiced otherwise than as specifically shown and described.

What is claimed is:
1. A tire insert display sign comprising:
  (a) a substantially flat panel adapted to be mounted on an automobile tire against the side thereof and covering the rim opening, said panel being formed of stiff sheet material,
  (b) a stiffening supporting easel for locking said insert onto the tire, said easel being formed of stiff material having parallel fold creases extending transversely across the panel and having fold creases at right angles thereto and adjacent to but spaced inwardly from the ends of the easel material and extending across the first mentioned parallel fold lines,
  (c) the mid-portion of the easel between the latter fold lines being secured to the inner face of the panel,
  (d) the ends of the easel being cut to form lugs, the adjacent sides of which are parallel and between which is a connecting transverse edge forming a shoulder parallel with the cross fold lines adjacent the ends of the easel,
  (e) said lugs being of a length to project beyond the inner diameter of the bead opening of the tire, while the end portions of the central section of the easel thus connect with the foldable lug portions by rectangular connections,
  (f) whereby these rectangular connecting areas and lug portions may be folded in the same plane at each end of the easel inwardly away from the panel,
  (g) and whereby the parallel side sections of the easel may be folded inwardly toward each other into a triangular stiffening formation, bringing said end area sections and lugs into aligned stiff supporting relation with the side sections of the easel and in which positions the inner edges of the lugs may thus be presented to and lock against the inner side of the bead.

2. The display sign defined in claim 1 in which the easel blank is formed with a tab and a locking slit adapted to hold the side sections in triangular formation.

3. The display sign defined in claim 1 in which the lugs beyond the transverse edge at one end of the easel blank are of a different length from those at the other end, and whereby when the shoulders and shorter lugs at one end of the easel engage a bead of a tire, the longer lugs may engage the bead of a tire of a diameter such that the bead is spaced from the shoulders at the longer lugs.

4. A stiffening, locking and supporting easel for an insert display sign adapted to be held thereby against the outer face of a tire, the easel being adapted to engage the inner side of bead rings of tires of different diameters, said easel being formed of stiffening material cut in the form of a blank adapted to extend across the inner side of a display panel, and having three parallel strips connected by parallel fold lines, and having additional fold lines extending transversely across the first pair of fold lines, one adjacent and spaced from each end of the blank thus forming a central section which may be glued to the face of the panel and beyond which are short rectangular sections between two separated ends, and the outer edge of these short sections being extended beyond the first mentioned parallel fold lines, and the blank being so cut as to form outwardly presented parallel shoulders longer at one end of the blank than at the other, and whereby the ends of the panel may be folded inwardly each as a flat section, and the side sections may then be folded toward each other bringing the end portions into positions aligned with the three sections of the easel blank, and means for holding the sides of the easel in the triangular supporting position.

References Cited in the file of this patent

UNITED STATES PATENTS

| | | |
|---|---|---|
| 1,232,766 | Cadmus | July 10, 1917 |
| 1,625,798 | Doering | Apr. 26, 1927 |
| 1,873,036 | Ring | Aug. 23, 1932 |
| 2,177,947 | Riley | Oct. 31, 1939 |
| 2,614,351 | Mullen | Oct. 21, 1952 |
| 2,632,268 | Schroeder | Mar. 24, 1953 |
| 2,824,395 | Decker | Feb. 25, 1958 |

FOREIGN PATENTS

| | | |
|---|---|---|
| 315,143 | Great Britain | July 11, 1929 |